United States Patent [19]

Baziuk

[11] Patent Number: 5,068,770
[45] Date of Patent: Nov. 26, 1991

[54] SELF-CLEANING LENS SHIELD FOR HEADLIGHTS

[76] Inventor: Maurice W. Baziuk, RR16 Trowbridge Road, Thunderbay, Ontario, Canada, P7B6B3

[21] Appl. No.: 577,998

[22] Filed: Sep. 5, 1990

[51] Int. Cl.$^5$ .......................... B60Q 1/00; F21V 33/00
[52] U.S. Cl. ..................................... 362/61; 15/250.01
[58] Field of Search .................. 362/96, 61; 15/250.01

[56] References Cited

U.S. PATENT DOCUMENTS 3,659,307  5/1972  Vitou .............................. 15/250.01
4,080,685  3/1979  Vanderpool ..................... 15/250.01

Primary Examiner—Ira S. Lazarus
Assistant Examiner—L. Heyman
Attorney, Agent, or Firm—Joseph C. Mason, Jr.; Ronald E. Smith

[57] ABSTRACT

An automotive headlamp is housed within a rotatable spherical shield so that light-diminishing road debris such as slush accumulates on the shield and not the headlamp. Wipers are mounted in wiping relation to the shield so that the debris is removed when the shield is rotated. A switch in the passenger compartment of a vehicle allows the driver to rotate the spherical shield as needed, and cleaning fluid is housed within a reservoir to enable operation of the mechanism over extended periods of time.

8 Claims, 3 Drawing Sheets

SELF-CLEANING LENS SHIELD FOR HEADLIGHTS

TECHNICAL FIELD

This invention relates, generally, to devices for cleaning automotive headlights. More particularly, it relates to a shield for headlights that cleans itself when road debris adversely effects the illumination capability of the light.

BACKGROUND ART

Highways and roads in far northern and southern parts of the world often become hazardous to drive upon in the winter. Local governments often place salt, sand, or other substances on the road surfaces to help melt the snow and ice and to increase the traction provided by the road surface. The result, sometimes, is a messy slush that is thrown onto the headlamps of vehicles traveling upon such roads. Even a thin layer of slush on the headlights significantly decreases the apparent candle power of the lamp. If the slush is allowed to build up, the reduction in illumination becomes unacceptable, and the driver must stop and wipe off the headlights. The temperature and other weather conditions at such times makes the headlight cleaning chore somewhat unpleasant. Moreover, since the lights must be cleaned alongside a road at a time when visibility conditions are poor, the person performing the cleaning operation is at risk. The very need to pull off the salted or sanded roadway itself creates difficulties in returning to the roadway from a slippery location, and danger to the person entering or exiting a vehicle.

Some automakers provide retractable headlights so that the lens of the headlights can remain clean when slushy roads are being traveled over during daylight hours.

Mercedes Benz provides a headlamp equipped with a reciprocating wiper much like the ubiquitous windshield wiper; U.S. Pat. No. 4,507,711 discloses that structure. Another wiper structure for a window is shown in U.S. Pat. No. 1,196,081 to Carence. U.S. Pat. No. 3,758,912 to Shiboya, et. al., shows a device for cleaning bowling balls that have become soiled with oil applied to the bowling alley, dirt from the bowler's hands, and the like. Other U.S. Pat. Nos. of interest include 4,038,286 and 2,948, 912 which disclose wipers for mirror lenses and U.S. Pat. No. 1,455,773 which shows a device for cleaning a lamp.

Thus, it is clear that the prior art neither teaches nor suggests how the problem of headlight slush removal could be solved in an optimal manner.

DISCLOSURE OF INVENTION

The longstanding but heretofore unfulfilled need for a self-cleaning headlight is now fulfilled in the form of a rotatably mounted transparent spherical lens shield that houses a conventional headlight.

A stationary wiper means, which may be in the form of one or more squeegees, brushes, sponges and the like, is positioned outside the spherical shield in wiping relation thereto, and appropriate reservoir means for containing a cleaning solution is disposed in fluid communication with said wiper means.

A motor means under the control of the vehicle operator rotates the shield when slush accumulates on the exposed surface thereof and the shield is wiped clean as it rotates past the stationary wiper means.

The invention has numerous applications beyond the environment of automotive headlights. It has utility in connection with any type of light, such as lights used on boats, heavy equipment, aircraft miner's hats, trains, and the like.

It is therefore understood that a general object of this invention is to materially advance the art of self-cleaning lights.

Additional objects, features and advantages of this invention will become apparent as this description proceeds.

The invention accordingly comprises the features of construction, combination of elements and arrangement of parts that will be exemplified in the construction set forth hereinafter and the scope of the invention will be set forth in the claims.

DESCRIPTION OF THE DRAWINGS

For a fuller understanding of the nature and objects of the invention, reference should be made to the following detailed description, taken in connection with the accompanying drawings, in which.

Similar reference numerals refer to similar parts throughout the several views of the drawings.

BEST MODES FOR CARRYING OUT THE INVENTION

Figure 1:
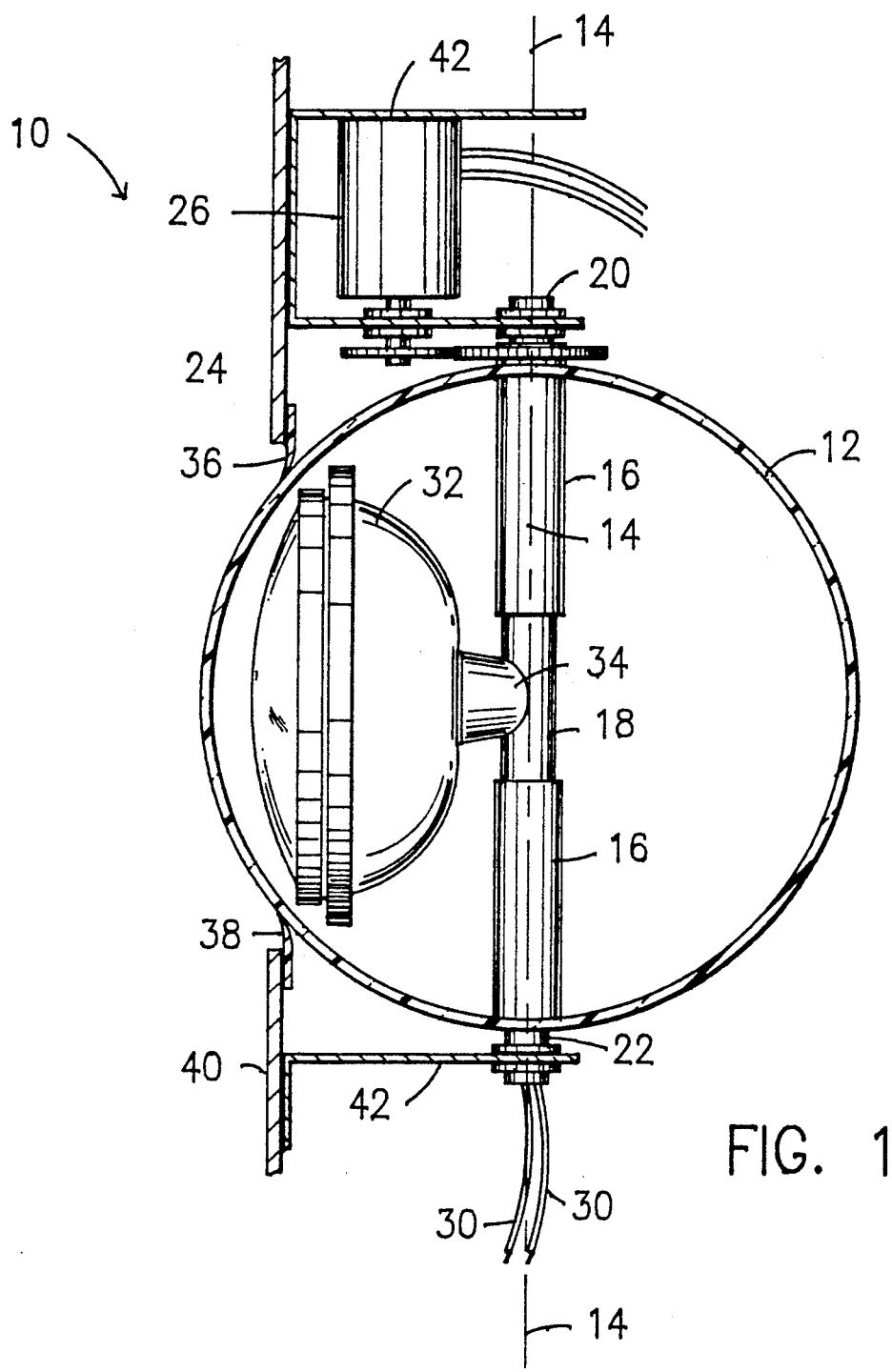
FIG. 1 is a sectional view taken along line 1-1 in FIG. 3.

Referring now to FIG. 1, it will there be seen that an exemplary embodiment of the invention is denoted by the reference numeral 10 as a whole.

Device 10 includes a transparent, spherical in configuration shield member 12 having an axis of rotation 14. Rotatably mounted axle 16 is hollow and receives nonrotatable hollow tube 18. Note that axle 16 is discontinuous along its middle part, thereby exposing the medical part of tube 18. The opposite ends 20, 22 of tube 18 penetrate shield 12 at diametrically opposed points as shown. The opposite ends of axle 16 are fixedly secured to said shield at said points so that rotation of axle 16 effects simultaneous and corresponding rotation of shield 12.

Axle 16 is connected by suitable gear means 24 to a motor means 26. A button or switch on the dashboard of the vehicle equipped with a commercial embodiment of the invention is conveniently positioned relative to the vehicle operator so that the operator can activate the motor 26 as needed through electrical leads 28. Note that only half of axle 16 is actively driven by motor means 26; the other half rotates passively when shield 12 rotates.

It should be noted that electrical leads 30 (at the bottom of FIG. 1) that connect headlamp 32 to the vehicle's source of electrical power are routed through hollow tube 18 in the manner depicted. Leads 30 extend to socket 34 within which lamp 32 is electrically received.

A pair of diametrically opposed stationary wiper blade members 36, 38 are suitably mounted on vehicle frame 40 in wiping relation to the exterior surface of spherical shield 12. Each wiper blade is arcuate in configuration to conform to the spherical surface of shield 12; the function of the wiper blades is to block debris from getting behind vehicle frame 40, as should be clear from FIG. 1

The frame for the novel structure 10 is denoted 42; that frame is in turn affixed by suitable means, not shown, to said vehicle frame 40.

Figure 2:
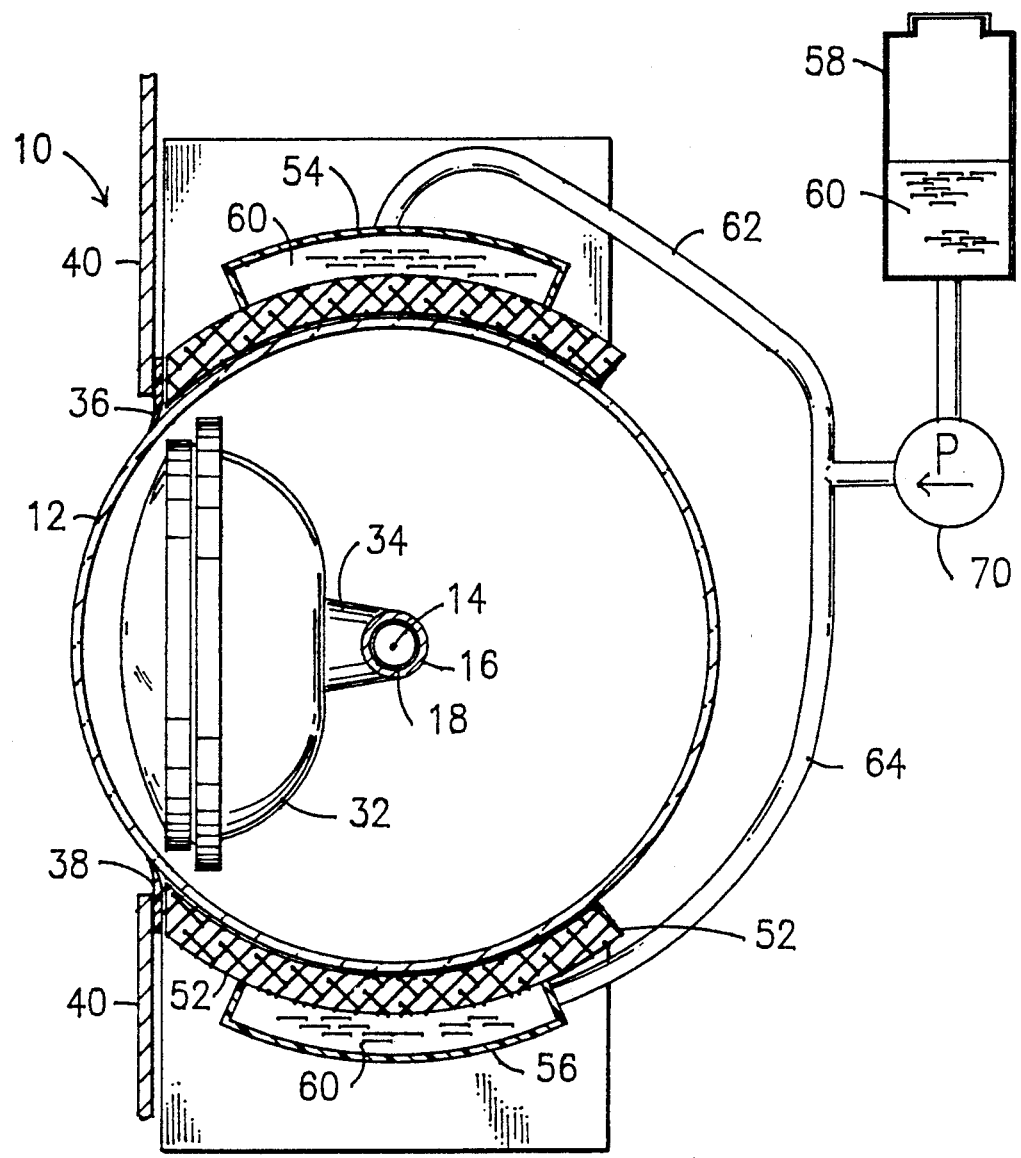
FIG. 2 is a sectional view taken along line 2-2 in FIG. 3.

Referring now to FIG. 2, it will there be seen that a pair of diametrically opposed absorbent cleaning units or applicator means 50, 52, which may be brushes, sponges, squeegees, or other suitable members, are disposed in contour-following abutting relation to sphere 12. A reservoir means 54, 56 is in open fluid communication with its associated applicator means 50, 52 to provide a continuous supply of cleaning fluid thereto. A main reservoir 58 (upper right hand corner of FIG. 2) having cleaning fluid 60 therein is in fluid communication with said respective reservoir means 54, 56 via passageways or tubes 62, 64 when pump 70 is activated by suitable means.

Accordingly, it should be clear that rotation of shield 12 removes road slush therefrom because the slush will be removed by the wiper blades 38, 38 and cleaning pads 50, 52 due to the relative movement between the rotating sphere about its axis 14 and the stationary cleaning pads 50, 52.

A heating element may be positioned in reservoir 58 or other suitable location to insure that the cleaning fluid 60 does not freeze.

Figure 3:
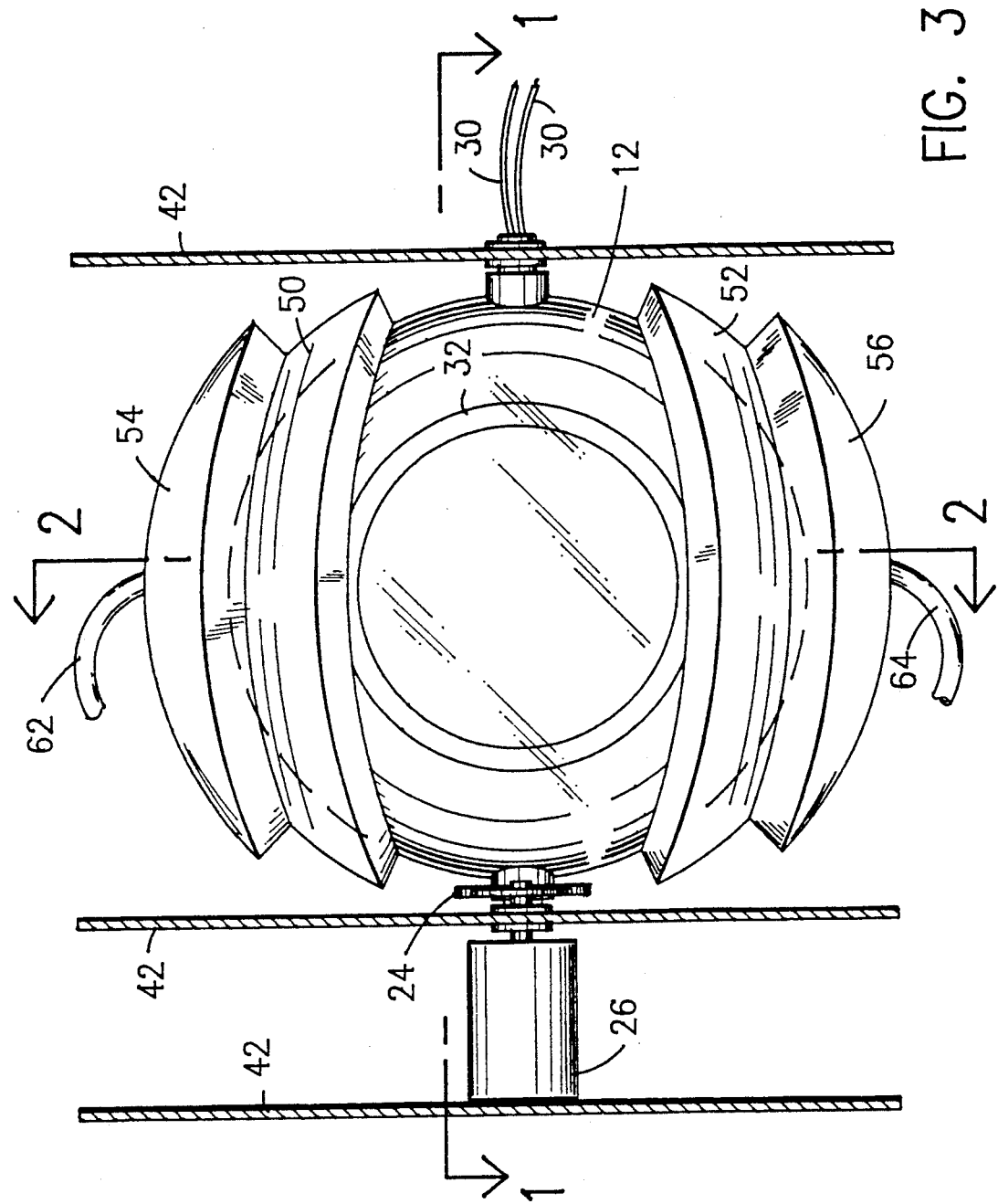
FIG. 3 is a front elevational view of the novel apparatus.

Most of the above-described parts can also be seen in FIG. 3. It should be noted that although sphere 12 has been shown and described as rotating about a horizontal axis 14, it should be equally clear that the cleaning pads 50, 52 and their associated reservoirs 54, 56 could be rotated ninety degrees from their respective depicted positions, and sphere 12 could be mounted for rotation about a vertical axis.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A device for protecting a light source, comprising:
    a transparent, spherical in configuration shield member;
    a hollow axle member disposed in diametrically extending relation to said shield member, said axle member having opposite ends fixedly secured to said shield member so that rotation of said axle member effects simultaneous and corresponding rotation of said shield member, and said axle member being discontinuous along its middle part;
    motor means for selectively activating rotation of said axle member;
    a hollow, non-rotatable tube that is received within said hollow axle member;
    said light source being mounted to said non-rotatable tube;
    said non-rotatable tube having opposite ends that penetrate and extend outwardly of said shield member;
    said light source being conductively coupled to a source of power by electrical conductors that extend from said source of power to said light source through said hollow, non-rotatable tube;
    whereby said light source is completely surrounded by said spherical shield member and protected thereby.

2. The device of claim 1, further comprising stationary, non-rotatable applicator means for applying a cleaning agent to an external surface of said shield member.

3. The device of claim 2, further comprising a reservoir means for retaining a preselected quantity of a cleaning fluid, and wherein said reservoir means is in fluid communication with said applicator means.

4. The device of claim 3, wherein said applicator means includes a pair of brush means that are contoured to follow the contour of said spherical shield member and which abuttingly engage said shield member.

5. The device of claim 4, further comprising a pair of stationary, non-rotatable wiper blade members that wipe said shield member prior to brushing of said shield member by said brush means.

6. The device of claim 5, wherein said wiper blade members are mounted to a vehicular frame.

7. The device of claim 5, further comprising a main reservoir means in selective fluid communication with said reservoir means for replenishing said cleaning fluid.

8. The device of claim 7, further comprising a pump means disposed between said main reservoir means and said reservoir means.

* * * * *